United States Patent
Rueckert et al.

(10) Patent No.: US 11,480,950 B2
(45) Date of Patent: Oct. 25, 2022

(54) METHOD OF CHANNEL MAPPING IN AN INDUSTRIAL PROCESS CONTROL SYSTEM

(71) Applicant: ABB Schweiz AG, Baden (CH)

(72) Inventors: Julius Rueckert, Langen (DE); Andreas Burger, Weingarten (DE); Heiko Koziolek, Karlsruhe (DE); Joerg Jeske, Minden (DE); Marie Christin Platenius-Mohr, Hirschberg an der Bergstrasse (DE); Sten Gruener, Ilvesheim (DE)

(73) Assignee: ABB Schweiz AG, Baden (CH)

( * ) Notice: Subject to any disclaimer, the term of this patent is extended or adjusted under 35 U.S.C. 154(b) by 91 days.

(21) Appl. No.: 16/929,143

(22) Filed: Jul. 15, 2020

(65) Prior Publication Data

US 2021/0018901 A1 Jan. 21, 2021

(30) Foreign Application Priority Data

Jul. 17, 2019 (EP) .................................... 19 186 772

(51) Int. Cl.
*G05B 19/418* (2006.01)
(52) U.S. Cl.
CPC ..... *G05B 19/4185* (2013.01); *G05B 19/4183* (2013.01); *G05B 19/41865* (2013.01)
(58) Field of Classification Search
CPC ............ G05B 19/4185; G05B 19/4183; G05B 19/41865; H04L 67/125
See application file for complete search history.

(56) References Cited

U.S. PATENT DOCUMENTS

| | | | |
|---|---|---|---|
| 5,980,078 A | * | 11/1999 | Krivoshein ......... G06F 9/44505 700/1 |
| 8,219,134 B2 | | 7/2012 | Maharajh et al. |
| 8,514,824 B2 | | 8/2013 | Fernandes et al. |
| 8,671,135 B1 | | 3/2014 | Joshi et al. |

(Continued)

FOREIGN PATENT DOCUMENTS

| EP | 1968251 A1 | 9/2008 |
|---|---|---|
| EP | 3211937 A1 | 8/2017 |

OTHER PUBLICATIONS

"Matthew O'Riordan, Publish-Subscribe: Introduction to Scalable Messaging, Jul. 2, 2020, Thenewstack, https://thenewstack.io/publish-subscribe-introduction-to-scalable-messaging/" (Year: 2020).*

(Continued)

*Primary Examiner* — Santosh R Poudel
(74) *Attorney, Agent, or Firm* — Leydig, Voit & Mayer, Ltd.

(57) ABSTRACT

A method of channel mapping in an industrial process control system includes: a) discovering a plurality of devices within the industrial process control system; b) obtaining at least one signal characteristic for each of the plurality of devices; c) determining channel mapping by a processing unit acting as a channel mapping agent, the plurality of devices being mapped to a plurality of communication channels, the channel mapping mapping each device to a communication channel for signal transmission, and the determining including utilizing the at least one signal characteristic for each of the plurality of devices; and d) configuring the devices according to the channel mapping.

16 Claims, 4 Drawing Sheets

(56) References Cited

U.S. PATENT DOCUMENTS

| | | |
|---|---|---|
| 9,450,773 B2 | 9/2016 | Tee et al. |
| 2004/0259533 A1* | 12/2004 | Nixon .................. H04W 40/24 455/414.1 |
| 2005/0033829 A1* | 2/2005 | Oommen ................ H04W 4/06 709/220 |
| 2007/0136473 A1* | 6/2007 | Birchler ................ H04L 45/308 709/226 |
| 2008/0002606 A1* | 1/2008 | Cheung ................ H04W 24/00 370/328 |
| 2010/0281097 A1* | 11/2010 | Mahnke ................ H04L 67/125 709/227 |
| 2011/0022705 A1* | 1/2011 | Yellamraju ........... H04L 65/756 709/227 |
| 2012/0269075 A1 | 10/2012 | Fernandes et al. |
| 2013/0163444 A1 | 6/2013 | Tee et al. |
| 2016/0315982 A1* | 10/2016 | Wallace .............. H04L 41/0816 |
| 2017/0180277 A1* | 6/2017 | Brady .................... H04L 51/04 |
| 2018/0123963 A1* | 5/2018 | Thubert ................ H04W 48/20 |
| 2019/0386931 A1* | 12/2019 | Sinha .................... H04L 67/306 |
| 2021/0003996 A1* | 1/2021 | Nagabhairava ....... G06F 16/903 |
| 2022/0086243 A1* | 3/2022 | Pang .................. H04L 41/5051 |

OTHER PUBLICATIONS

"Toby Jaffey, MQTT and CoAP, IoT Protocols, Eclipse Foundation, 2022, https://www.eclipse.org/community/eclipse_newsletter/2014/february/article2.php" (Year: 2022).*

Burger et al.: Bottleneck Identification and Performance Modeling of OPC UA Communication Models, *ICPE '19: Proceedings of the 2019 ACM/SPEC International Conference on Performance Engineering*, Apr. 2019 pp. 231-242.

Naik Nitin: "Choice of effective messaging protocols for IoT systems: MQTT, CoAP, AMQP and HTTP", 2017 IEEE International Systems Engineering Symposium (!SSE), IEEE, Oct. 11, 2017 (Oct. 11, 2017), pp. 1-7.

Hoffert et al.: "Using Machine Learning to Maintain Pub/Sub System QoS in Dynamic Environments", ACM ARM Workshop, Dec. 2009.

* cited by examiner

METHOD OF CHANNEL MAPPING IN AN INDUSTRIAL PROCESS CONTROL SYSTEM

CROSS-REFERENCE TO PRIOR APPLICATION

Priority is claimed to European Patent Application No. EP 19 186 772.0, filed on Jul. 17, 2019, the entire disclosure of which is hereby incorporated by reference herein.

FIELD

The present invention relates to a method of channel mapping in an industrial process control system and to an apparatus for carrying out the method.

BACKGROUND

Classical industrial automation systems consist of industrial controllers running real-time operating systems to execute control logic/programs that process sensor readings from a process and take control decisions by changing settings of actuators inside the process (e.g. the speed of a pumps, motors, opening/closing valves, etc.)—see FIG. 1 that shows a representative industrial automation system. A process can be a chemical production process, a gas or oil production process, an energy generation process, or any other industrial application that requires automatic control. Controllers can additionally interact or be integrated into a process control system (PCS), typically consisting of several server instances. Operator workstations can connect to the servers to enable human operators to supervise the process and to interact with it. The method and apparatus described here has applicability for such a PCS, however they can also be used in other similar or simpler industrial control settings where control devices interact with field devices, i.e. sensors and actuators, via for example the protocol Open Platform Communications Unified Architecture (OPC UA), which is introduced in the following.

For the communication among any of the entities within an industrial automation systems, industrial standards were developed to allow for maximum interoperability of solutions across vendors. A key standard in this respect is OPC UA (Open Platform Communication Unified Architecture-IEC 62541). It defines a platform independent, service-oriented architecture and covers a wide range of relevant aspects of such an architecture in a multi-part standard (see opcfoundation.org/at developer-tools/specifications-unified-architecture). This standard was extended in 2018 by part 14, adding a new communication mode called publish-subscribe. A communication mode describes how entities in industrial automation systems interact and exchange data. The original part of the standard defined only client-server-based communication as communication mode, where a software client can connect to a running instance of an OPC UA server to retrieve data or change data exposed by the server. The new extension enables also a publish-subscribe like communication among devices, where an entity or server (now called publisher) makes data available to clients (now called subscribers) without explicitly establishing connections to these subscribers. The publisher pushes the data to the network or a so-called broker that then take care of distributing it to the subscribers interested in the data.

With this extension, the standard exposes various options for devices in industrial automation systems to exchange data. Which option to use is a hard question to answer as the choice depends on many factors. The functional and non-functional requirements for an information exchange can vary widely depending on the application. Also, the device and network resources can play an important role. Some applications might require fast communication of data changes to a few clients/subscribers, others have less strict time constraints but need to serve a large number of clients/subscribers at the same time. When to use either a client-server or publish-subscribe mode communication and how to configure these modes is a complicated task and hard to achieve during design time of a system. The reason for this is the wide range of configuration parameters, the typically hard to estimate performance of an implementation, and network conditions at the time of operation. The latter is particularly hard to anticipate given the trend towards more dynamic scenarios where temporal devices might be connected to an automation system for monitoring, debugging, asset management, etc., for which requirements were not known at design time. Nowadays solutions are to rather statically configure such systems and doing overprovisioning of device and network resources. This leads to inflexible systems with underutilized resources.

In operation, data among senders and receivers (clients/servers or publisher/subscribers) can be said to be exchanged via a specific communication channel. The notion of a channel describes the communication mode/technology as well as a particular configuration of that mode (e.g. delivery of a particular data value by a sensor every 10 ms via a network-based publish/subscribe to 10 specific clients). Defining such channels manually is very hard at design time and even during operation of a system.

Thus, in summary for industrial control systems, engineers today manually decide on the usage of network communication channels to connect devices during the planning or commissioning of a control system. With the wide range of communication settings for OPC UA client/server and publish/subscribe, this is problematic, error-prone, and likely to result in suboptimal configurations that lead to a waste of network resources or unfulfilled application requirements. While other parts of the commissioning have been automated, to date this part remains a manual step.

There is a need to address these problems.

Therefore, it would be advantageous to have an improved technique to decide on the usage of network communication channels between devices in a process control system.

SUMMARY

In an embodiment, the present invention provides a method of channel mapping in an industrial process control system, the method comprising: a) discovering a plurality of devices within the industrial process control system; b) obtaining at least one signal characteristic for each of the plurality of devices; c) determining channel mapping by a processing unit acting as a channel mapping agent, wherein the plurality of devices are mapped to a plurality of communication channels, wherein the channel mapping maps each device to a communication channel for signal transmission, and wherein the determining comprises utilizing the at least one signal characteristic for each of the plurality of devices; and d) configuring the devices according to the channel mapping.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
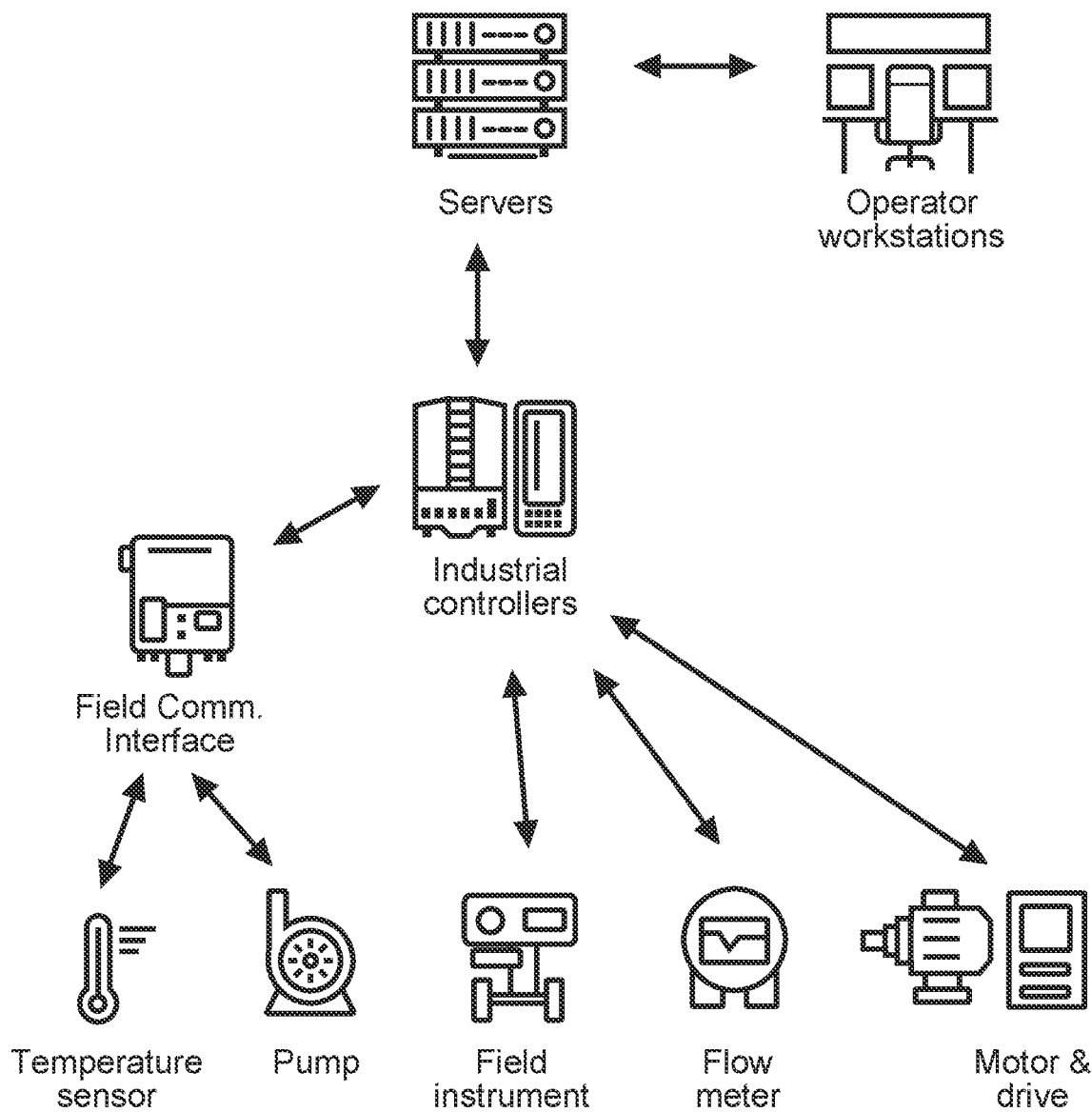
FIG. 1 shows a schematic representation of an industrial automation system or process control system.

In a first aspect, there is provided a method of channel mapping in an industrial process control system, the method comprising:

a) discovering a plurality of devices within an industrial process control system;

b) obtaining at least one signal characteristic for each of the plurality of devices;

c) determining channel mapping by a processing unit acting as a channel mapping agent, wherein the plurality of devices are mapped to a plurality of communication channels, wherein the channel mapping maps each device to a communication channel for signal transmission, and wherein the determining comprises utilizing the at least one signal characteristic for each of the plurality of devices; and d) configuring the devices according to the channel mapping.

In an example, step c) comprises determining the communication channel for each device from a number of possible communication channels for each device, the determining comprising utilizing an optimization objective.

In an example, utilizing the optimization objective comprises determining a channel mapping that minimises resource usage for the plurality of communication channels.

In an example, the resource usage comprises: CPU, memory or network load.

In an example, utilizing the optimization objective comprises determining a channel mapping that provides configuration for the plurality of communication channels that maximises a robustness of the plurality of communication channels.

In an example, the at least one signal characteristic comprises one or more of: signal references from devices, timeliness of signal transmissions, and resource constraints including network bandwidth.

In an example, the signal references comprises one or more of: provided signals from devices, offered signals from devices, and required signals from devices.

In an example, step c) comprises mapping two or more devices to a communication channel when the two or more devices have the same or substantially the same signal references.

In an example, step c) comprises mapping the two or more devices to the communication channel when the two or more devices exhibit the same or substantially the same timeliness of signal transmissions, wherein the timeliness of signal transmissions comprises timing requirements.

In an example, step c) comprises utilizing at least user provided mapping constraint.

In an example, the at least one user provided mapping constraint comprises weighting of different aspects of the resource usage.

In an example, step a) is carried out by the processing unit.

In an example, step b) is carried out by the processing unit.

In an example, step d) is carried out by the processing unit.

In a second aspect, there is provided an apparatus comprising a processing unit, configured to carry out the method of the first aspect.

Thus, an automatic channel mapping agent for offline and online usage to derive optimized mappings, e.g., with a reduced device and network load is provided. In an online mode, the agent can optimize the system at runtime and support temporally connected monitoring devices as well as other, so far unsupported use cases. The invention shortens engineering time, while yielding resource-optimized and robust system configurations.

The above aspects and examples will become apparent from and be elucidated with reference to the embodiments described hereinafter.

Figure 2:
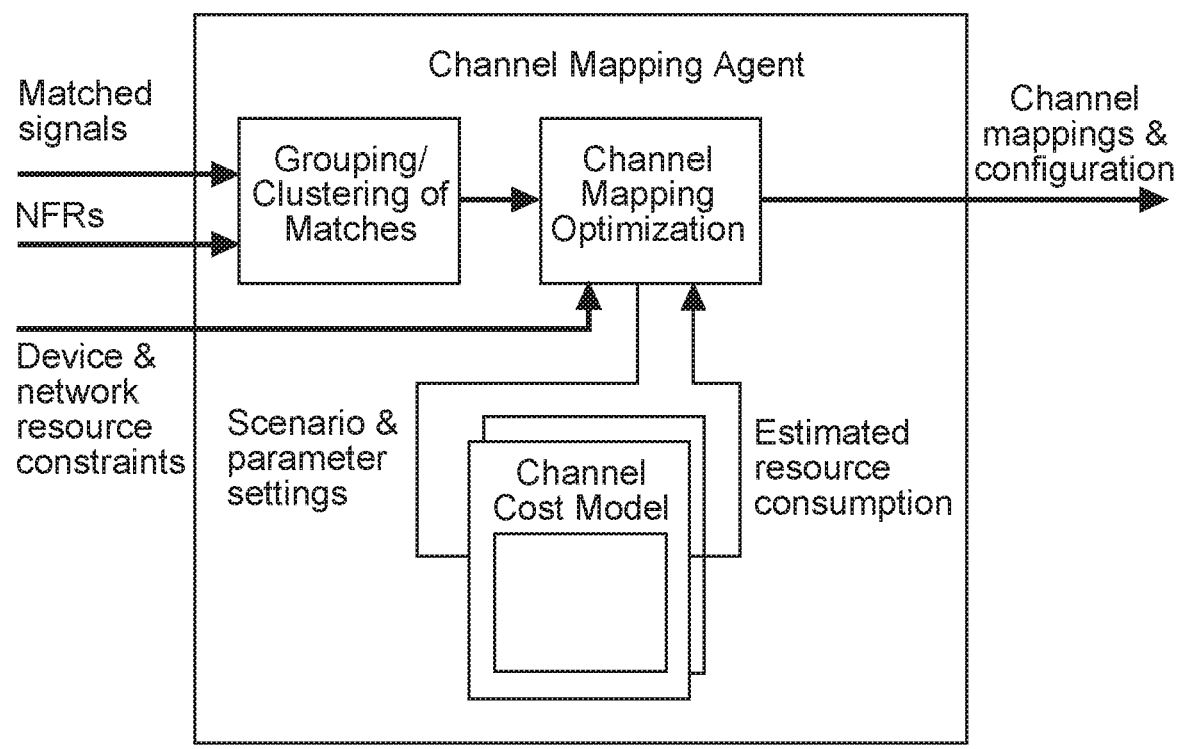
FIG. 2 shows a schematic representation of the channel mapping agent.
Figure 3:
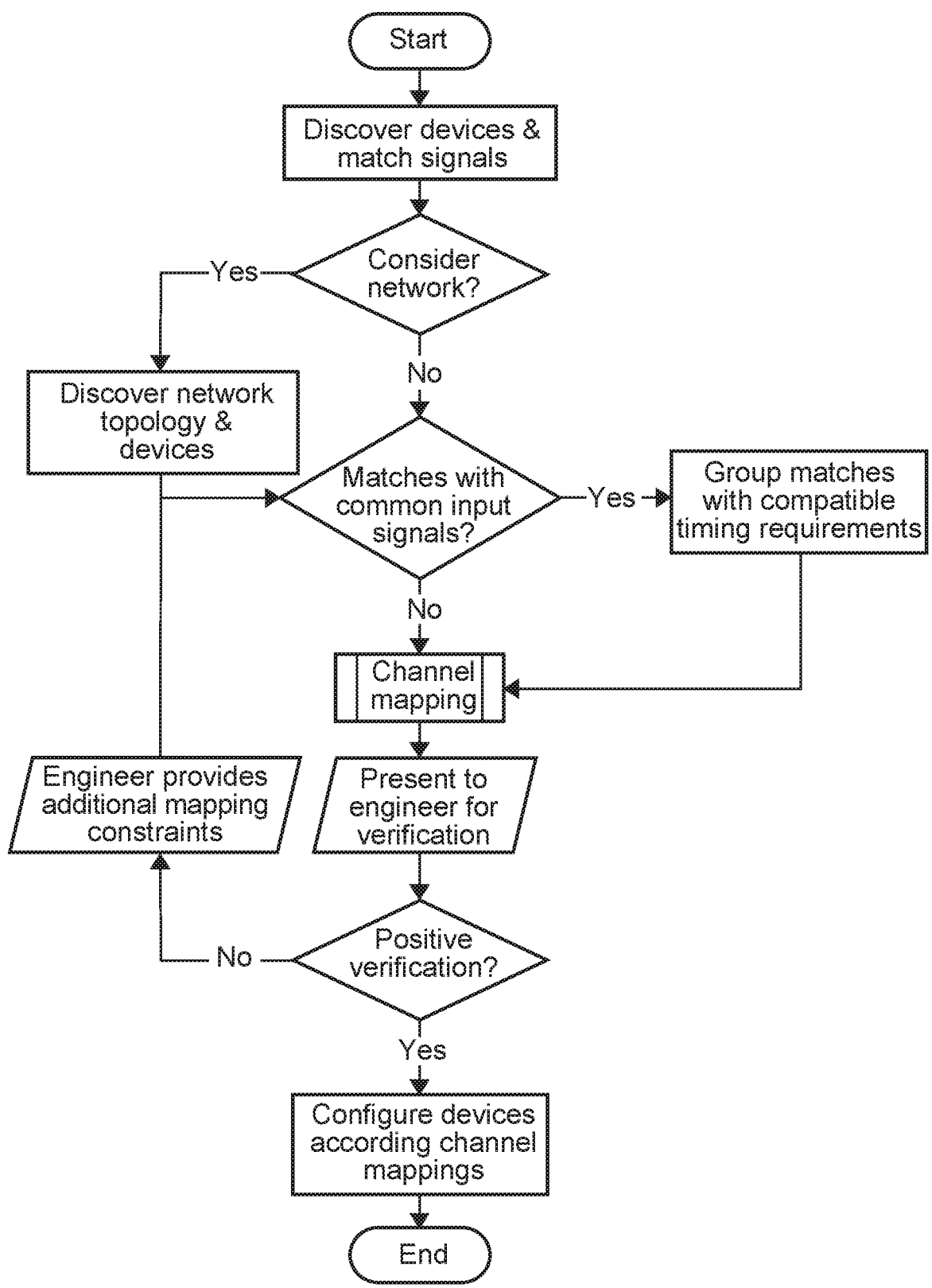
FIG. 3 shows a detailed work flow for device discovery, channel mapping, verification process and device configuration during a process control system commissioning phase.
Figure 4:
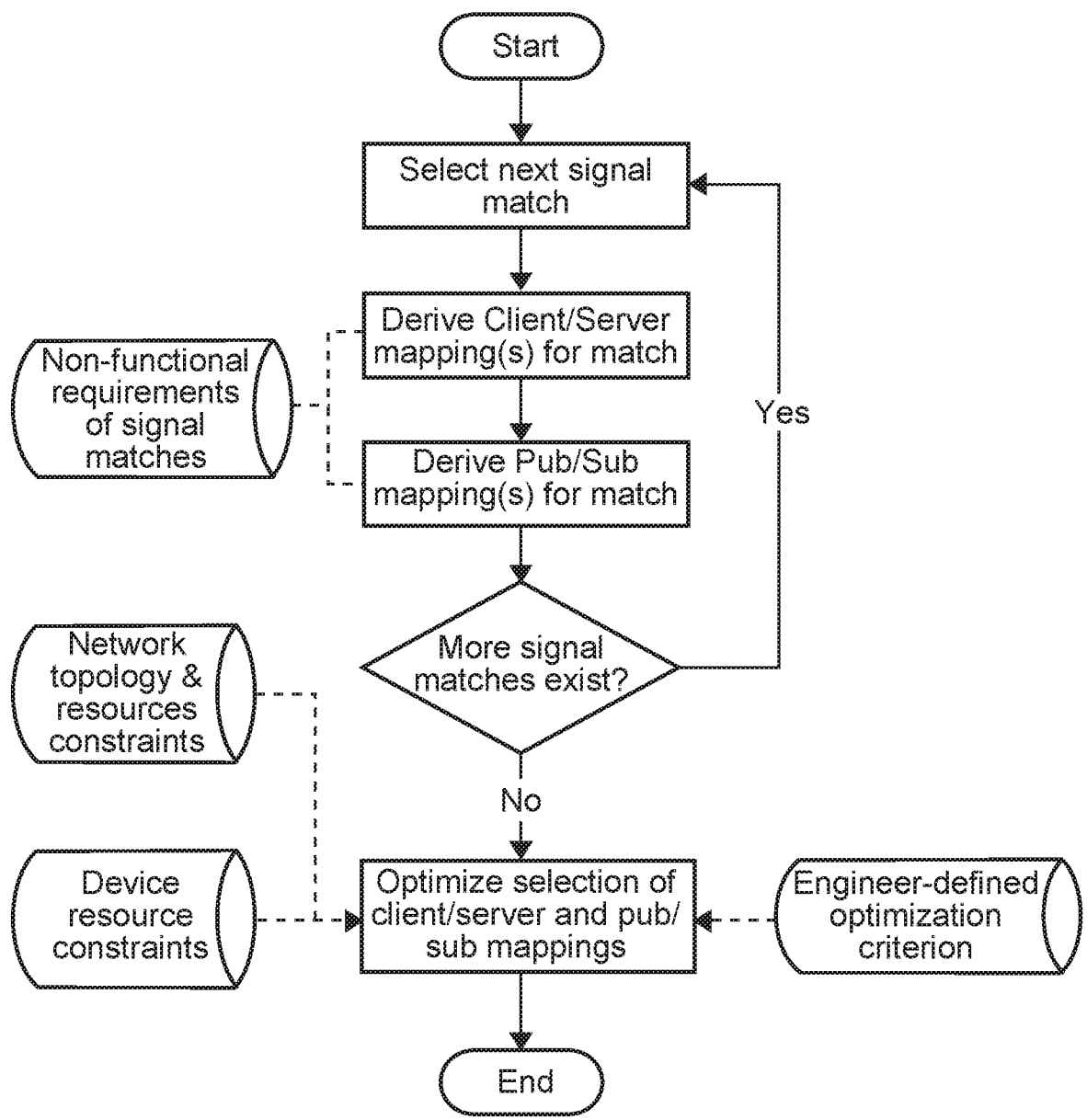
FIG. 4 shows a detailed work flow for the channel mapping sub-flow as shown in FIG. 3.

FIGS. 2-4 relate to channel mapping in an industrial process control system. In an example a method of channel mapping in an industrial process control system comprises:

a) discovering a plurality of devices within an industrial process control system;

b) obtaining at least one signal characteristic for each of the plurality of devices;

c) determining channel mapping by a processing unit acting as a channel mapping agent, wherein the plurality of devices are mapped to a plurality of communication channels, wherein the channel mapping maps each device to a communication channel for signal transmission, and wherein the determining comprises utilizing the at least one signal characteristic for each of the plurality of devices; and d) configuring the devices according to the channel mapping.

According to an example, step c) comprises determining the communication channel for each device from a number of possible communication channels for each device, the determining comprising utilizing an optimization objective.

According to an example, utilizing the optimization objective comprises determining a channel mapping that minimises resource usage for the plurality of communication channels.

According to an example, the resource usage comprises: CPU, memory or network load.

According to an example, utilizing the optimization objective comprises determining a channel mapping that provides configuration for the plurality of communication channels that maximises a robustness of the plurality of communication channels.

According to an example, the at least one signal characteristic comprises one or more of: signal references from devices, timeliness of signal transmissions, and resource constraints including network bandwidth.

According to an example, the signal references comprises one or more of: provided signals from devices, offered signals from devices, and required signals from devices.

According to an example, step c) comprises mapping two or more devices to a communication channel when the two or more devices have the same or substantially the same signal references.

According to an example, step c) comprises mapping the two or more devices to the communication channel when the two or more devices exhibit the same or substantially the same timeliness of signal transmissions, wherein the timeliness of signal transmissions comprises timing requirements.

According to an example, step c) comprises utilizing at least user provided mapping constraint.

According to an example, the at least one user provided mapping constraint comprises weighting of different aspects of the resource usage.

According to an example, step a) is carried out by the processing unit.

According to an example, step b) is carried out by the processing unit.

According to an example, step d) is carried out by the processing unit.

Thus, in addition an apparatus comprising a processing unit can be utilized to carry out the method as described above.

Continuing with the figures, the method and apparatus will be described in further detail relating to specific embodiments. The new technique of channel mapping between devices in a process control system utilizes a channel mapping agent. A detailed example is shown schematically in FIG. 2, which shows the channel mapping agent and its inputs as well as outputs. The channel mapping agent, is an entity that can be used in an online or offline manner to guide the manual configuration process or automatically configure communication channels for the signal transmission among devices in an automation process. In the online mode, the agent can be an independent hardware/software component that is temporally connected to the system, e.g., during the commissioning or be connected permanently during runtime to continuously optimize channel mappings. In the offline mode, the agent can be used to derive mappings in the planning phase as part of an engineering software tools to dimension device and network resources. The channel mapping optimization objective can be to reduce the overall resource usage (i.e. CPU, memory, or network load), while fulfilling process requirements (e.g., communication latencies), or to derive configurations that are easy to maintain and understand for engineers. The agent uses the resulting channel mappings to configure the devices and network.

The channel mapping agent takes as input the signal references from devices, non-functional requirements on these signals, such as the required timeliness of signal transmissions, and resource constraints, such as network bandwidth. This information is used by the channel mapping agent to derive a mapping of each individual signal to a pre-defined or new communication channel. This is done by solving an optimization problem, which, e.g., uses the overall resource usage of all channels as optimization objective. This is possible by using performance/cost models for the different communication channel classes. These mathematical models enable the agent to effectively explore the configuration/settings parameter space (i.e. number of pub/sub groups, key frame count, timers, etc.). For further in formation on how such channel cost models can be generated based on measurement studies reference is made to the paper by A. Burger et al. "Bottleneck Identification and Performance Modeling of OPC UA Communication Models", ICPE '19 Proceedings of the 2019 ACM/SPEC International Conference on Performance Engineering, Pages 231-242.

As a result of the mapping step, signals are either being delivered via client/server or pub/sub subscriptions, where the latter can be set up to bundle signals to save resources, e.g., by jointly delivering them via an IP multicast group or a specific topic using a broker-based pub/sub mode.

Information base: To perform channel mappings, the channel mapping agent uses several inputs, including provided/offered signals and required signals of devices, non-functional requirements of required signals, as well as device and network resource constraints. For devices with an OPC UA server, the agent connects as OPC UA client, browses the server address space, and characterizes the signals. Additional metadata can exposed inside the address space to express non-functional signal requirements. A controller, e.g., expresses the minimum update rate for required signals, while signal providers, such as field devices, express output signal capabilities, such as the supported publishing rates. For devices without OPC UA servers, a proprietary server module can be utilized to answer agent queries in a lightweight manner without exposing an OPC UA address space. This option has utility for supporting the approach also for resource-constraint devices.

Communication channel mapping: The channel mapping agent groups the signal matches according to their non-functional requirements. Matches with joint signals and compatible requirements are mapped to shared channels. This way matches including a joint required signal can be mapped to a single pub/sub channel with a publishing rate high enough to satisfy all receivers. As a result, the load on the publishing device and network is reduced while serving the same number of devices. Similarly, mappings can prefer client-server subscriptions if, e.g., the network does not support IP multicast, no more multicast groups can be allocated, or devices are overloaded by a setting. The agent uses platform-specific or generic resource models to take mapping decisions, similar but not limited to the models proposed in the inventors' research paper mentioned above.

Device configuration: The configuration is done either using the configuration model exposed in the OPC UA address space, the transfer of a configuration file, or via a proprietary protocol for channel configuration. For the OPC UA-based variant, the channel mapping agent can be provided with the necessary security credentials to configure the channel endpoints using role-based access rights.

FIG. 3 shows in further detail the steps taken by the channel mapping agent in the channel mapping discussed above.

In the first step, the devices in the automation system are discovered and their signal offers and desires are detected. In this example offers and interests are exposed by the devices using OPC UA servers that can be discovered via standard protocols and browsed by the agent. The pure matching of signals can be based on names to find matches between offers and requests. Such a signal matching is available as input from state-of-the-art, and as such is not discussed in further here.

Based on such a rudimentary matching, the new method and apparatus considers the network properties and resources in the channel mapping to follow. If the network is to be considered (this can be a decision by the engineer or a configuration of the channel mapping agent), the network topology is discovered using state-of-the-art mechanisms. This can include discovery protocols, actively probing the network or interfacing with a network management and control system. In a modern network, the channel mapping agent would interface with the network control and management system that maintains an up-to-date global view on the network topology and its state. This information includes information on the automation devices connected but also network details, such as network devices and their connectivity as well as switching/routing resources. This network information can be an important input for particular channel configurations where network support for multicast delivery is required or can be leveraged for a reduced resource consumption. While the agent would strive to maximize the number of signals being delivered via resource-efficient pub/sub multicast channels, the number of such channels can be limited by the resources of switches and routers. If not taken into account, overloaded network devices result in IP multicast traffic being broadcasted throughput the network. This is undesired and can cause severe load on connected devices. The new method and apparatus described here avoids such configurations by taking the resource limits of the network devices into account.

As a next step, the channel mapping agent analyzes all signal matches, which are sender-receiver pairs for a particular data item/variable/input signal. If multiple matches exist with the same sender and a common input signal, the pairs are further analyzed to determine if they have compatible timing requirements. For example, if one receiver requires a signal every 10 ms, another only every 100 s, depending on the slow receiver's resources, they might not be considered compatible to avoid overloading a device with undesired high-frequency updates. If they have the same timing requirements or differ in an acceptable range, they are grouped and passed to the channel mapping subroutine (see FIG. 4 and the associated description for further details). But even without compatible timing requirements, signals might be grouped by the channel mapping step based on other criteria if processing updates with a higher frequency than required does not pose problems to the receiver.

After channel mapping is performed, the result can be presented to an engineer for verification. For this purpose, the channel mapping agent can present the channel mapping results in a graphical manner to the engineer to explore the mapping and verify it. For this, the predicted performance of derived mappings can be shown based on the output of the mathematical models of the communication channels and the derived configurations. In case, the channel mapping agent generated an optimized version of a previously verified configuration, changes to the original mapping are highlighted. For this to be possible, the channel mapping agent maintains a versioned history of channel mappings which also enables engineers to recover or inspect past channel mappings. This mapping history could be also exported and reused for similar systems of the same kind.

In the next step, the engineer can acknowledge the proposed channel mapping. If he/she does not acknowledge the mapping, additional mapping constraints can be manually added. This might be required in case the previous steps were not able to retrieve all required data or the engineer discovers faulty configurations. The engineer can add missing information that are stored also for later use by the agent and versioned with the resulting proposed mappings. With this updated information base, the mapping steps are re-executed as described before.

In case, the engineer acknowledges the channel mappings, the agent configures the devices and enables the configuration. This requires that the automation system is brought into a safe operational state, devices are reconfigured, the operation of the channels is verified by reading the configuration (are all devices receiving their required signals?) and, in case of doubts, requesting an approval by the engineer before continuing the operation. In case of minor changes, online updates can be imagined, where, e.g., signals are temporarily simulated or disabled if the process allows for it. This, however, would require the engineer to supervise the process and react in case of problems. However, such user based verification is not always necessary.

FIG. 4 shows further details relating to the internal processes of the step "Channel Mapping" of FIG. 3. Here, stepwise, each signal match (as explained, these are signal matches with same sender and common input signals), is added to the set of considered matches. For this set, possible client-server and publish-subscribe mappings are derived based on the non-functional requirements for the signal matches (e.g. time constraints for the delivery) until all matches are considered. At this point, several possible mappings for each signal may exist. The resulting matches are now examined based on the resource consumption they impose on the automation devices, the network devices, and network links. Using an optimization algorithm or heuristic, a complete set of compatible matches is determined that, e.g., leads to a minimum resource consumption. Other optimization criteria can be used, or different aspects of the resource consumption be weighted by the engineer based on the desired outcome. As an alternative to the resource consumption, also the robustness of the system can be an optimization goal. Here, e.g., more robust channel mappings can be preferred over resource-efficient ones. As a direct result of the above process, all configurations derived in this process fulfill the non-functional requirements of the process.

Thus, an automatic system to perform a channel mapping and configuration based on mathematical models of communication channels is provided. An engineer can use the new solution to derive adequate channel mappings during design or commissioning of an automation system (offline mode). In addition, the new solution can be used in an online mode to optimize existing channel mappings. This could happen based on historic monitoring data from the system on resource consumption and performance as well as live by an online channel mapping agent that continuously monitors the system and takes optimization as well as reconfiguration decisions. The latter is especially important to support new dynamic use cases, where, e.g., temporarily new clients/subscribers enter the system to collect data.

The invention is related to the OPC UA standard (IEC 62541) in that it was inspired by its wide range of communication channel settings and possibility to expose additional information and constraints in a device's OPC UA address space to support/guide the proposed channel mapping agent. The above described method and apparatus, thus, can be understood as an extension that relies on the existing standard but goes beyond its current scope.

OPC UA, IEC 62541, opcfoundation.org/at developer-tools/specifications-unified-architecture.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of channel mapping in an industrial process control system, the method comprising:
   a) discovering a plurality of devices within the industrial process control system;
   b) obtaining at least one signal characteristic for each of the plurality of devices;
   c) determining channel mapping by a processing unit acting as a channel mapping agent, wherein the plurality of devices are mapped to a plurality of communication channels, wherein the channel mapping maps each device to a communication channel for signal transmission, and wherein the determining comprises utilizing the at least one signal characteristic for each of the plurality of devices, wherein step c) comprises determining the communication channel for each device from a number of possible communication channels for each device, the determining comprising utilizing an optimization objective; and
   d) configuring the devices according to the channel mapping,
   wherein the plurality of communication channels comprises a client/server communication channel and a publish/subscribe communication channel,
   wherein the plurality of devices comprises a first plurality of devices and second plurality of devices,
   wherein the first plurality of devices are mapped to the client/server communication channel, and
   wherein the second plurality of devices are mapped to the publish/subscribe communications channel.

2. The method according to claim 1, wherein utilizing the optimization objective comprises determining a channel mapping that minimizes resource usage for the plurality of communication channels.

3. The method according to claim 2, wherein the resource usage comprises: CPU, memory, or network load.

4. The method according to claim 2, wherein step c) comprises utilizing at least one user provided mapping constraint.

5. The method according to claim 4, wherein the at least one user provided mapping constraint comprises weighting of different aspects of the resource usage.

6. The method according to claim 1, wherein utilizing the optimization objective comprises determining a channel mapping that provides configuration for the plurality of communication channels that maximizes a robustness of the plurality of communication channels.

7. The method according to claim 1, wherein the at least one signal characteristic comprises one or more of: signal references from devices, timeliness of signal transmissions, and resource constraints including network bandwidth.

8. The method according to claim 7, wherein the signal references comprise one or more of: provided signals from devices, offered signals from devices, and required signals from devices.

9. The method according to claim 7, wherein step c) comprises mapping two or more devices to a communication channel when the two or more devices have the same or substantially the same signal references.

10. The method according to claim 9 wherein, step c) comprises mapping the two or more devices to the communication channel when the two or more devices exhibit the same or substantially the same timeliness of signal transmissions, and
    wherein the timeliness of signal transmissions comprises timing requirements.

11. The method according to claim 1, wherein step a) is carried out by the processing unit.

12. The method according to claim 1, wherein step b) is carried out by the processing unit.

13. The method according to claim 1, wherein step d) is carried out by the processing unit.

14. An apparatus, comprising:
    processing circuitry configured to carry out the method of claim 1.

15. The method according to claim 1, wherein the determining the communication channel for each device comprises, for a first device or the plurality of devices, determining from the number of possible communication channels that comprises at least two from among the following: a first client/server communications channel with a first subset of the plurality of devices; a second client/server communications channel with a second subset of the plurality of devices, different from the first subset; and a first publish/subscribe channel.

16. The method according to claim 1, wherein utilizing the optimization objective comprises: evaluating a performance model or cost model for each of the number of possible communication channels as part of determining the communication channel for each device from a number of possible communication channels for each device.

* * * * *